US012754737B2

(12) United States Patent

Du et al.

(10) Patent No.: US 12,754,737 B2
(45) Date of Patent: Oct. 6, 2026

(54) EMBEDDED GATEWAY SYSTEM WITH DATA PREFETCH MECHANISM

(71) Applicant: Airoha Technology (Suzhou) Limited, Suzhou City (CN)

(72) Inventors: Peng Du, Nanjing City (CN); Fei Yan, Nanjing City (CN)

(73) Assignee: Airoha Technology (Suzhou) Limited, Suzhou City (CN)

( * ) Notice: Subject to any disclaimer, the term of this patent is extended or adjusted under 35 U.S.C. 154(b) by 83 days.

(21) Appl. No.: 19/043,512

(22) Filed: Feb. 2, 2025

(65) Prior Publication Data

US 2025/0251934 A1 Aug. 7, 2025

(30) Foreign Application Priority Data

Feb. 7, 2024 (CN) ......................... 202410175720.5

(51) Int. Cl.
*G06F 9/30* (2018.01)
*G06F 11/34* (2006.01)
*G06F 13/16* (2006.01)

(52) U.S. Cl.
CPC ...... *G06F 9/30047* (2013.01); *G06F 11/3423* (2013.01); *G06F 13/1689* (2013.01)

(58) Field of Classification Search
None
See application file for complete search history.

(56) References Cited

U.S. PATENT DOCUMENTS

| | | | | |
|---|---|---|---|---|
| 2018/0173433 | A1 | 6/2018 | Miller | |
| 2019/0013965 | A1 | 1/2019 | Sindhu | |
| 2024/0345774 | A1* | 10/2024 | Sano | G06F 3/0604 |

FOREIGN PATENT DOCUMENTS

| | | | |
|---|---|---|---|
| CN | 101695440 | A | 4/2010 |
| TW | 200845035 | | 11/2008 |
| TW | 202349214 | A | 12/2023 |

* cited by examiner

*Primary Examiner* — Scott C Sun
(74) *Attorney, Agent, or Firm* — Winston Hsu

(57) ABSTRACT

An embedded gateway system includes a processor, a first memory, a second memory, and a data prefetch circuit. The processor is used to execute a first program. The first memory is used to store a first data. The first memory and the second memory are external memories of the processor, and access latency of the second memory is lower that access latency of the first memory. The data prefetch circuit is used to perform a first data prefetch operation upon the first memory for reading a first prefetched data from the first memory and writing the first prefetched data into the second memory. Before a time point at which the processor executes a data access code segment of the first program to access the first data, the first data prefetch operation reads the first data from the first memory as the first prefetched data.

19 Claims, 4 Drawing Sheets

EMBEDDED GATEWAY SYSTEM WITH DATA PREFETCH MECHANISM

BACKGROUND OF THE INVENTION

1. Field of the Invention

The present invention relates to data processing in an embedded gateway system, and more particularly, to an embedded gateway system that improves data access efficiency of a processor with the aid of a data prefetch circuit.

2. Description of the Prior Art

A network processing unit (NPU) is a high-speed programmable processor specifically used for network packet processing (e.g., network packet forwarding). It has certain features and architecture to boost processing efficiency of network packet forwarding. For example, an NPU can be implemented by a RISC-V processor. For a traditional network device, an external memory is generally used to store data to be processed by the RISC-V processor, such as using a dynamic random access memory (DRAM) to store packet data. The RISC-V processor needs to perform data access operations on the DRAM. However, one data access operation performed on the DRAM will take a long period of time to complete. During this period of time, the RISC-V processor will stall to wait for the data access operation of the DRAM to complete, thus resulting in a waste of processor resources.

SUMMARY OF THE INVENTION

One of the objectives of the claimed invention is to provide an embedded gateway system that improves data access efficiency of a processor with the aid of a data prefetch circuit.

According to a first aspect of the present invention, an exemplary embedded gateway system is disclosed. The exemplary embedded gateway system includes a processor, a first memory, a second memory, and a data prefetch circuit. The processor is arranged to execute a first program. The first memory is arranged to store a first data. The first memory and the second memory are external memories of the processor, and access latency of the second memory is lower than access latency of the first memory. The data prefetch circuit is arranged to perform a first data prefetch operation upon the first memory for reading a first prefetched data from the first memory and writing the first prefetched data into the second memory, wherein before a time point at which the processor executes a data access code segment of the first program to access the first data, the first data prefetch operation reads the first data from the first memory as the first prefetched data.

According to a second aspect of the present invention, an exemplary embedded gateway system is disclosed. The exemplary embedded gateway system includes a RISC-V processor, a first memory, a second memory, and a data prefetch circuit. The RISC-V processor is arranged to execute a first program. The first memory is arranged to store a first data. Access latency of the second memory is lower than access latency of the first memory. The data prefetch circuit is arranged to perform a first data prefetch operation upon the first memory for reading a first prefetched data from the first memory and writing the first prefetched data into the second memory, wherein before a time point at which the RISC-V processor executes a data access code segment of the first program to access the first data, the first data prefetch operation reads the first data from the first memory as the first prefetched data.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
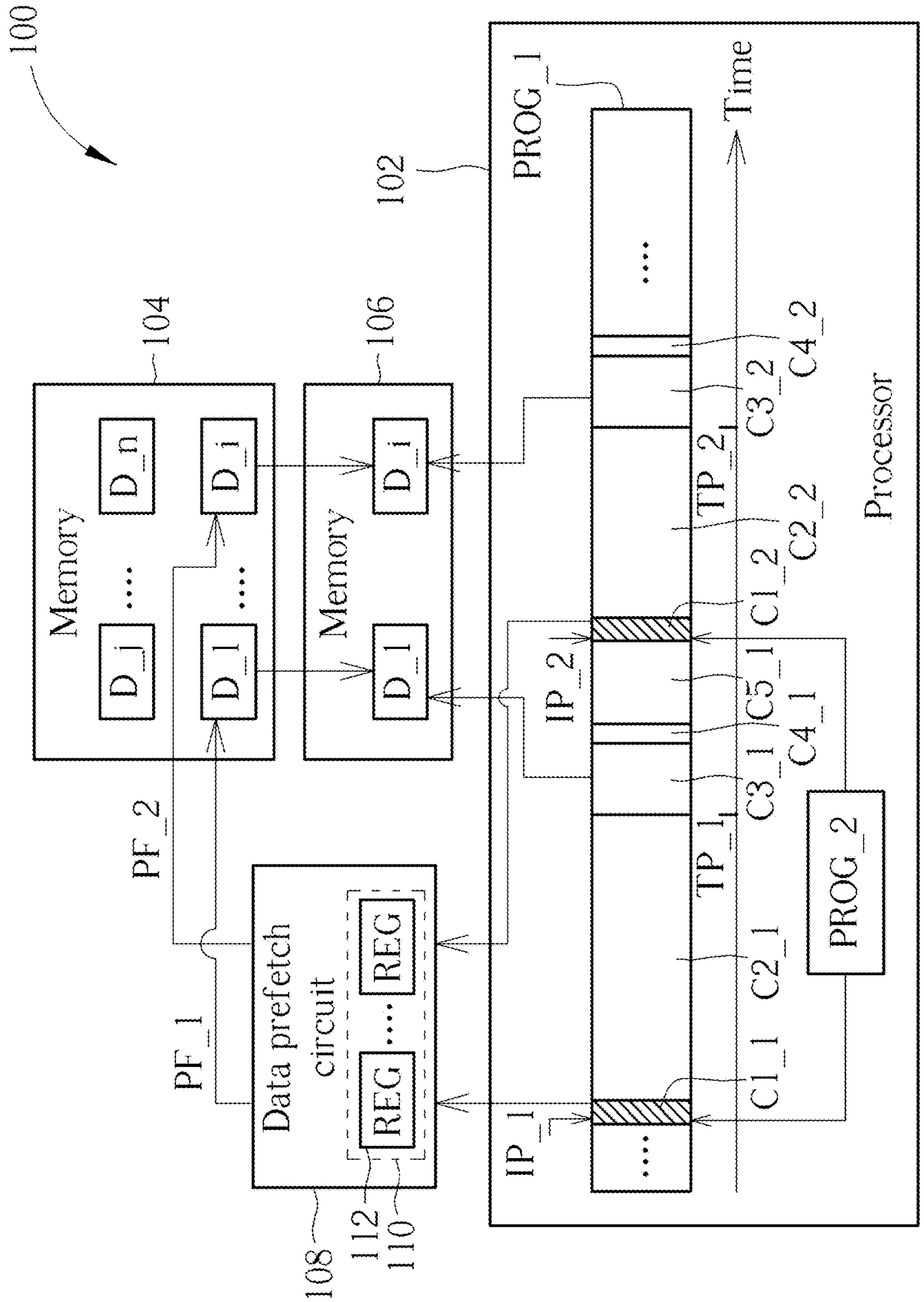
FIG. 1 is a diagram illustrating an embedded gateway system with a data prefetch mechanism according to an embodiment of the present invention.

Please refer to FIG. 1. FIG. 1 is a diagram illustrating an embedded gateway system with a data prefetch mechanism according to an embodiment of the present invention. The embedded gateway system 100 includes a processor 102, a plurality of memories 104 and 106, and a data prefetch circuit 108. For example, the embedded gateway system 100 is a network device, and the processor 102 may be used as an NPU to process network packets received by a network interface card or a network chip of the network device to assist the packet forwarding task. For example, the processor 102 may be implemented using a RISC-V processor. However, this is for illustrative purposes only, and is not meant to be a limitation of the present invention. In practice, any embedded gateway system using the proposed architecture shown in FIG. 1 falls within the scope of the present invention. In addition, FIG. 1 only illustrates components pertinent to the present invention. In practice, the embedded gateway system 100 may include other components to achieve designated functions.

The memories 104 and 106 are external memories of the processor 102. For example, the memories 104 and 106 are not integrated with the processor 102 in the same semiconductor die. The access latency of the memory 106 is lower than the access latency of the memory 104. In other words, the memory 106 is a high-speed memory, while the memory 104 is a low-speed memory. For example, the memory 104 may be a DRAM, and the memory 106 may be a static random access memory (SRAM). The data prefetch circuit 108 is a hardware circuit with data prefetch capability, and is used to perform a data prefetch operation on the memory 104, read a prefetched data from the memory 104, and write the prefetched data into the memory 106. As shown in the figure, the memory 104 may be used to store a plurality of data D_1, . . . , D_i, D_j, . . . , D_n. The data prefetch circuit 108 may read the data D_1 as a prefetched data for a data prefetch operation, and may write the data D_1 into the memory 106 for subsequent use by the processor 102. Similarly, the data prefetch circuit 108 may read the data D_i as a prefetched data for another data prefetch operation, and write the data D_i into the memory 106 for subsequent use by the processor 102. Compared to the processor 102 taking a lot of time to deal with each access operation of the low-speed memory (e.g., memory 104), the processor 102 can quickly access the required data through the high-speed memory (e.g., memory 106). Therefore, the stalling time of the processor 102 waiting for data can be greatly reduced, thereby effectively improving the data processing performance of the processor 102. To put it simply, regarding an application where a memory of a processor is an external memory, the present invention can at least solve the problem of the processor stalling time for waiting for data, such that the processor stalling time can be reduced.

In this embodiment, the processor 102 executes the program PROG 1 to perform data processing (e.g., packet data processing), and further executes the program PROG 2 to determine when to instruct the data prefetch circuit 108 to initiate/start the data prefetch operation. As shown in FIG. 1, the program PROG 1 includes a plurality of code segments such as C1_1, C2_1, C3_1, C4_1, C5_1, C1_2, C2_2, C3_2, and C4_2, wherein the code segments C1_1 and C1_2 are data prefetch code segments inserted by the program PROG 2, code segments C3_1 and C3_2 are data access code segments, and code segments C2_1, C5_1, and C2_2 are code segments used for performing data processing operations other than data prefetch and data access. In addition, the code segments C4_1 and C4_2 are code segments used for waiting for data access to complete. Before the time point TP_1 at which the processor 102 executes the data access code segment C3_1 of the program PROG 1 to access the data D_1, the data prefetch code segment C1_1 located before the data access code segment C3_1 is first executed to instruct the data prefetch circuit 108 to initiate/start the data prefetch operation PF_1 for reading the data D_1 from the memory 104 as the prefetched data of the data prefetch operation PF_1 and writing the data D_1 into the memory 106. Similarly, before the time point TP_2 at which the processor 102 executes the data access code segment C3_2 of the program PROG 1 to access the data D_i, the data prefetch code segment C1_2 located before the data access code segment C3_2 is first executed to instruct the data prefetch circuit 108 to initiate/start the data prefetch operation PF_2 for reading the data D_i from the memory 104 as the prefetched data of the data prefetch operation PF_2 and writing the data D_i into the memory 106.

When the processor 102 executes the data access code segment C3_1 of the program PROG 1 to access the data D_1, if the data D_1 has been prefetched and is now available in the memory 106, the processor 102 can quickly access the required data D_1 through the memory 106. Since the memory 106 is a high-speed memory (e.g., SRAM), the stalling time of the processor 102 executing the code segment C4_1 to wait for the data access to complete can be shortened significantly. Similarly, when the processor 102 executes the data access code segment C3_2 of the program PROG 1 to access the data D_i, if the data D_i has been prefetched and is now available in the memory 106, the processor 102 can quickly access the required data D_i through the memory 106. Since the memory 106 is a high-speed memory (e.g., SRAM), the stalling time of the processor 102 executing the code segment C4_2 to wait for the data access to complete can be shortened significantly.

Since the data prefetch circuit 108 is a hardware circuit, the data prefetch circuit 108 is equipped with a register array 110 that acts as a communication interface between hardware and software, wherein the register array 110 may include a plurality of registers (labeled as "REG") 112 used to store a plurality of parameters of the data prefetch operation. For example, the parameter Reg Slow Addr indicates a start address of the data to be prefetched (e.g., D_1 or D_i) in the memory 104, the parameter Reg Start indicates whether the data prefetch operation should be initiated, and the parameter Reg Status indicates the execution status of the data prefetch operation (e.g., whether the data prefetch operation is completed).

Figure 2:
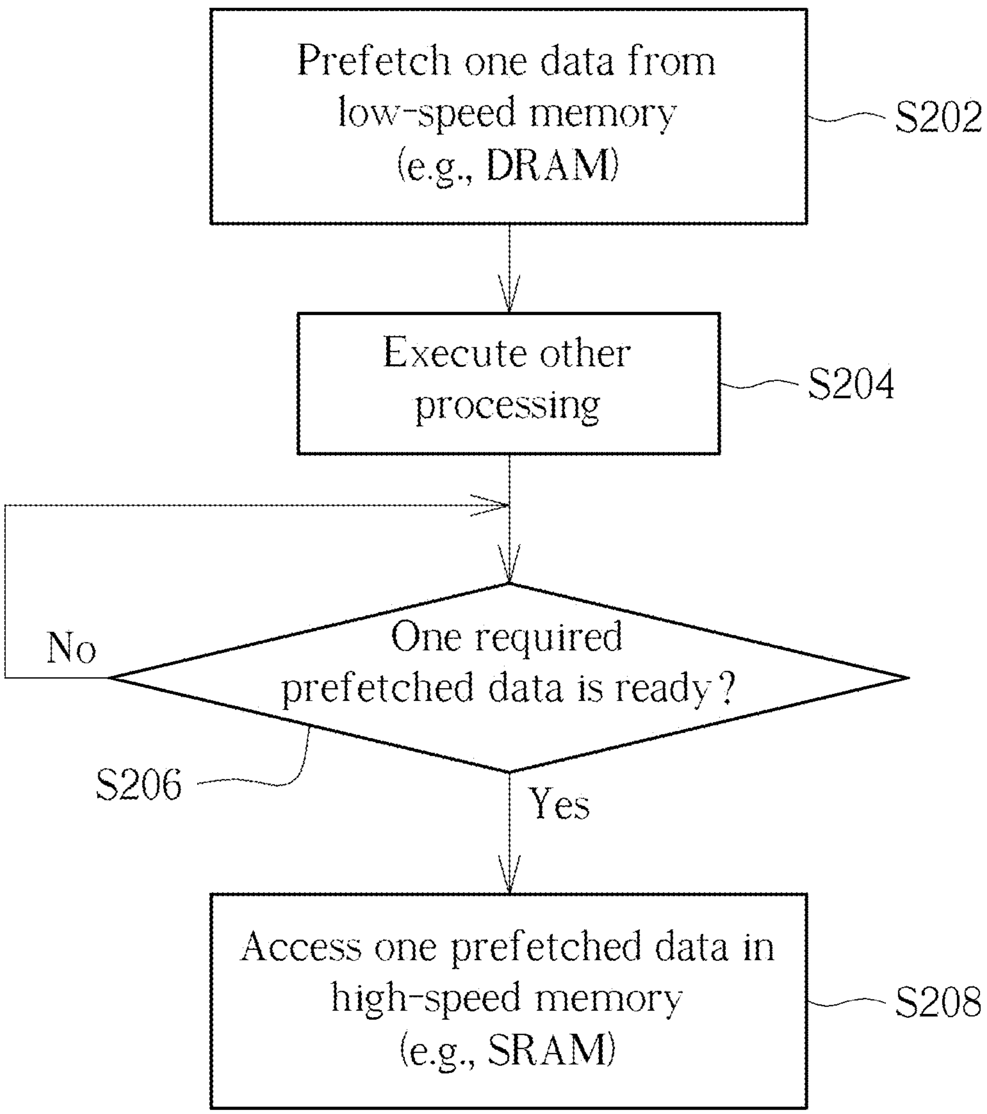
FIG. 2 is a flowchart of data processing performed by the embedded gateway system with a data prefetch mechanism as shown in FIG. 1.

Please refer to FIG. 2 in conjunction with FIG. 1. FIG. 2 is a flowchart of data processing performed by the embedded gateway system 100 with a data prefetch mechanism as shown in FIG. 1. Provided that the result is substantially the same, the steps are not required to be executed in the exact order shown in FIG. 2. In step S202, the processor 102 executes the data prefetch code segment (e.g., C1_1 or C1_2) included in the program PROG 1 to instruct the data prefetching circuit 108 to initiate/start a data prefetch operation (e.g., PF_1 or PF_2) to prefetch (i.e., pre-read) the data (e.g., D_1 or D_i) required by the subsequent data access code segment (e.g., C3_1 or C3_2).

In step S204, the processor 102 executes the subsequent_ code segment (e.g., C2_1 or C2_2) following the data prefetch code segment (e.g., C1_1 or C1_2) to perform other processing. In step S206, the processor 102 executes the data access code segment (e.g., C3_1 or C3_2) to check whether the required data (e.g., D_1 or D_i) is already available in the memory 106 due to data prefetch. When the required data (e.g., D_1 or D_i) is already available in the memory 106 due to data prefetch, the processor 102 can execute the data access code segment (e.g., C3_1 or C3_2) to quickly access the required data through the memory 106, without having to slowly access the required data through the memory 104 (step S208).

As described above, the program PROG 2 is executed to insert data prefetch code segments C1_1 and C1_2 into the program PROG 1. In this embodiment, the program PROG 2 refers to certain time delay parameters to determine insertion points IP_1, IP_2 where respective data prefetch code segments C1_1, C1_2 are inserted into the program PROG 1. By setting the appropriate insertion points IP_1, IP_2, the data prefetch operation may complete writing the required data (e.g., D_1 or D_i) into the memory 106 exactly at the time point (e.g. TP_1 or TP_2) (or may complete writing the required data (e.g., D_1 or D_i) into the memory 106 before the time point (e.g. TP_1 or TP_2)). Therefore, the processor 102 may have the optimum data processing performance through the data prefetch mechanism.

For example, a plurality of time delay parameters t_prefetch, t_code may be referenced to find appropriate settings of insertion points IP_1, IP_2. The processor 102 is further arranged to execute the program PROG 2 to measure execution time required for each data prefetch operation, to obtain the time delay parameter t_prefetch. In other words, through multiple measurements, the average execution time t_prefetch_avg of the data prefetch operation (e.g., the average value of 1000 measurement results), the longest execution time t_prefetch_max (e.g., the maximum value of 1000 measurement results), and the shortest execution time t_prefetch min (e.g., the minimum value of 1000 measurement results) can be obtained. In this embodiment, the time delay parameter t_prefetch may be set by the average execution time t_prefetch_avg, but the present invention is not limited thereto. Please note that, due to inherent characteristics of the storage device, the time delay parameter t_prefetch may not be a constant value.

In addition, the processor 102 is further arranged to execute the program PROG 2 to measure execution time required by different numbers of program code lines in the program PROG 1 executed by the processor 102, to obtain a plurality of time delay parameters, respectively. For example, the time delay parameter t_code_100 is the execution time required for executing 100 lines of the program code, the time delay parameter t_code_120 is the execution time required for executing 120 lines of the program code, the time delay parameter t_code_150 is the execution time required for executing 150 lines of the program code, and so on. For a single fixed function, the code segment is almost unchanged, so the required execution time of the code segment is basically a constant value.

In order to determine an insertion point of each data prefetch code segment in the program PROG 1, it is necessary to find a value of the time delay parameter t_code (e.g., one of t_code_100, t_code_120, and t_code_150) that satisfies the following condition: t_code>t_prefetch. The found time delay parameter t_code decides the number of program code lines between the insertion point of the data prefetch code segment (e.g., IP_1 or IP_2) and the time point of the subsequent data access code segment (e.g., TP_1 or TP_2). In other words, the position of the insertion point in the program PROG 1 can be determined based on the number of program code lines that corresponds to the found time delay parameter t_code.

Assuming that each data prefetch operation is to access 16 bytes of data, the measurement statistics of 1000 data prefetch operations can be shown in the following table. Please note that the amount of data prefetched in each data prefetch operation can be determined according to actual design requirements. For example, each data prefetch operation may access 64 bytes of data or 32 bytes of data.

TABLE 1

| Item | Avg | Max | Min |
|---|---|---|---|
| t_prefetch (ns) | 160 | 483.75 | 143.75 |

In addition, the measurement statistical results of the required execution time for different numbers of program code lines can be shown in the following table.

TABLE 2

| Number of lines | 100 | 120 | 150 |
|---|---|---|---|
| t_code (ns) | 125 | 156.25 | 202.5 |

If the time delay parameter t_prefetch is set by the average execution time t_prefetch_avg, the advanced time (i.e., t_code-t_prefetch_avg) will have different values for the required execution time of different numbers of program code lines (e.g., t_code_100, t_code_120 and t_code_150), as shown in the following table.

TABLE 3

| Number of lines | 100 | 120 | 150 |
|---|---|---|---|
| t_code (ns) | 125 | 156.25 | 202.5 |
| t_prefetch (ns) | 160 | 160 | 160 |
| Advanced time | −35 | −3.75 | 42.5 |
| Insertion point set? | No | No | Yes |

Basically, as long as the advanced time is not a negative value, the insertion point can be set based on the number of program code lines corresponding to the time delay parameter t_code. In this example, the insertion point (e.g., IP_1 or IP_2) of the data prefetch code segment may be set at a position which is 150 lines before the data access code segment at the time point (e.g., TP_1 or TP_2). Please note that the above is for illustrative purposes only, and is not meant to be a limitation of the present invention. If the execution time of other numbers of program code lines (e.g., 130 lines and 140 lines) in the program PROG 1 executed by the processor 102 is additionally measured, a time delay parameter t_code that is larger than and closest to the time delay parameter t_prefetch can be found, thereby obtaining the optimum position of the insertion point (e.g., IP_1 or IP_2) of the data prefetch code segment.

For the same execution path, the processor may need to access multiple related data when performing data processing. However, when a distance between memory addresses of the multiple related data in the low-speed memory is large, it is impossible to complete reading the multiple related data by using only a single data prefetch operation, and multiple data prefetch operations may be initiated to read the multiple related data in a multi-channel parallel processing manner.

Figure 3:
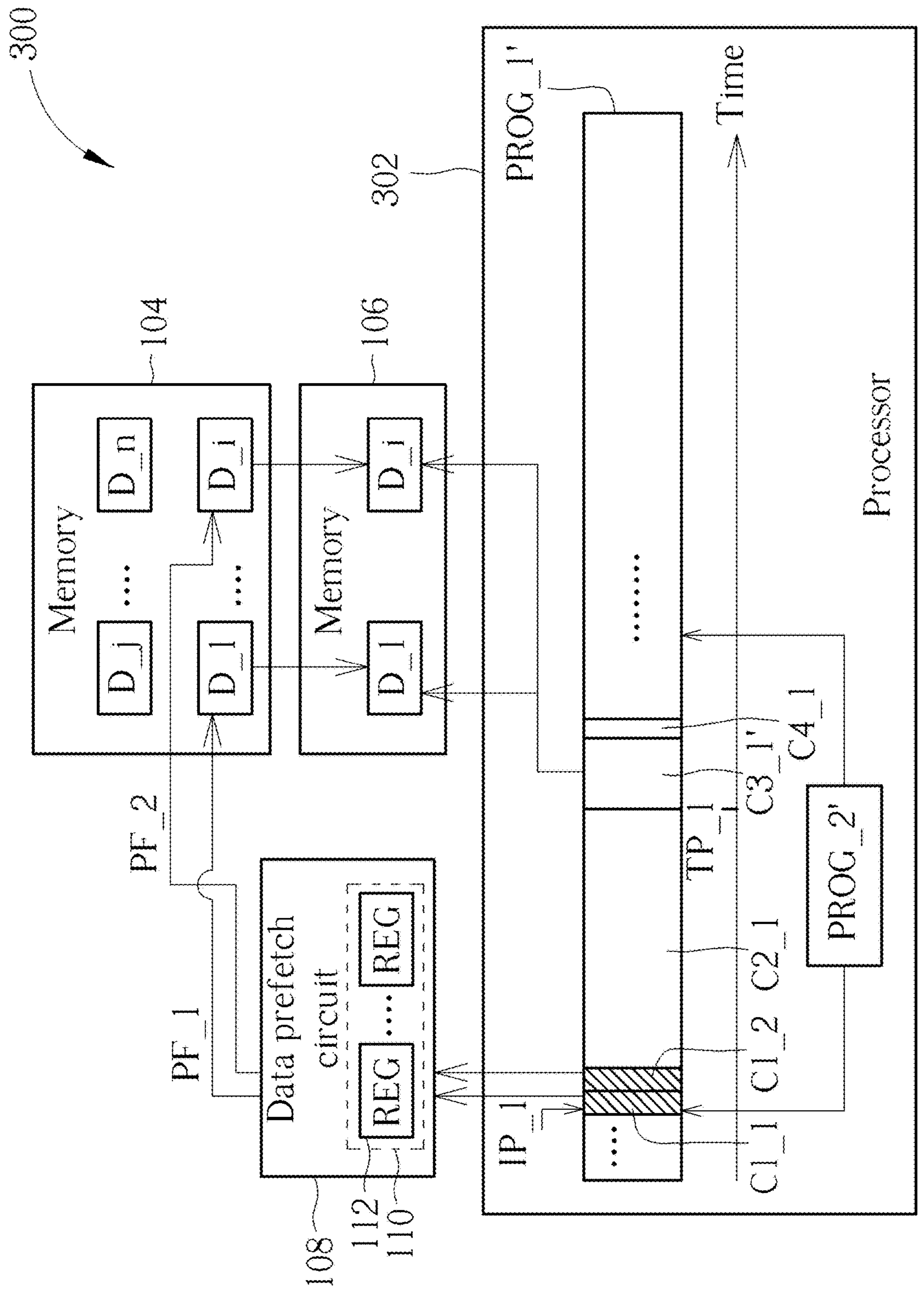
FIG. 3 is a diagram illustrating another embedded gateway system with a data prefetch mechanism according to an embodiment of the present invention.

Please refer to FIG. 3. FIG. 3 is a diagram illustrating another embedded gateway system with a data prefetch mechanism according to an embodiment of the present invention. The main difference between the embedded gateway systems 100 and 300 is that the processor (e.g., an NPU implemented using a RISC-V processor) 302 executes the program PROG 1' to perform data processing (e.g., packet data processing), and the data access code segment C3_1' included in the program PROG 1' needs to access the data D_1 and the data D_i. In addition, the processor 302 executes the program PROG 2 'to determine that the data prefetch code segments C1_1 and C1_2 are sequentially inserted into the program PROG 1'. In this way, before the time point TP_1 at which the processor 302 executes the data access code segment C3_1' to access the data D_1 and D_i, the processor 302 executes the prefetch code segment C1_1 to instruct the data prefetch circuit 108 to execute the data prefetch operation PF_1 for reading the data D_1 from the memory 104 as the prefetched data and writing the data D_1 into the memory 106. In addition, the processor 302 executes the data prefetch code segment C1_2 to instruct the data prefetch circuit 108 to execute the data prefetch operation PF_2 for reading the data Di from the memory 104 as prefetched data and writing the data D_i into the memory 106, wherein execution time of the prefetch operation PF_1 overlaps execution time of the data prefetch operation PF_2.

Figure 4:
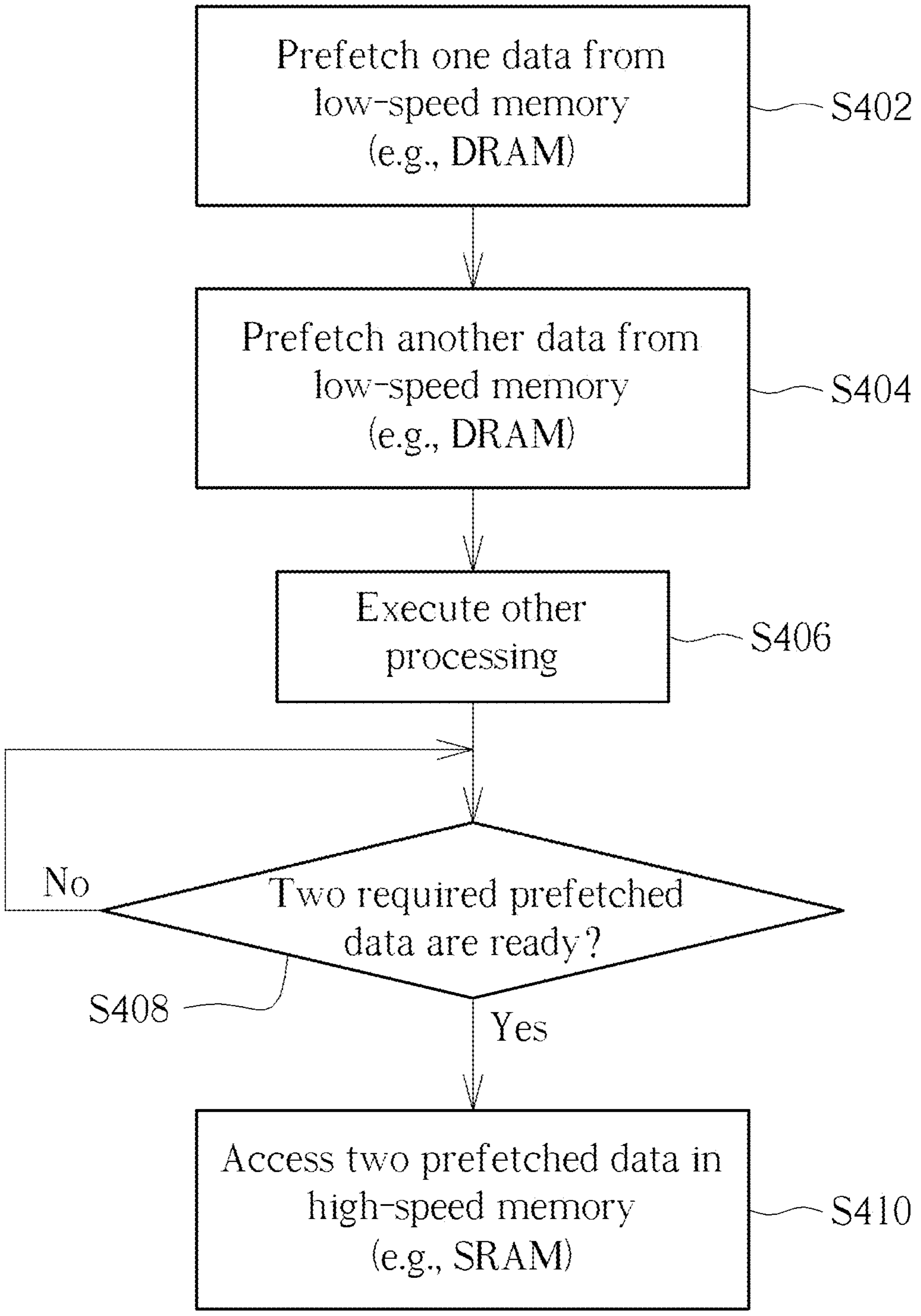
FIG. 4 is a flowchart of data processing performed by the embedded gateway system with a data prefetch mechanism as shown in FIG. 3.

Please refer to FIG. 4 in conjunction with FIG. 3. FIG. 4 is a flowchart of data processing performed by the embedded gateway system 300 with a data prefetch mechanism as shown in FIG. 3. Provided that the result is substantially the same, the steps are not required to be executed in the exact order shown in FIG. 4. In step S402, the processor 302 executes the data prefetch code segment C1_1 included in the program PROG 1' to instruct the data prefetch circuit 108 to initiate/start the data prefetch operation PF_1, to prefetch (i.e., pre-read) the first data D_1 required by the subsequent data access code segment C3_1'. In step S404, the processor 302 executes the data prefetch code segment C1_2 included in the program PROG 1' to instruct the data prefetch circuit 108 to initiate/start the data prefetch operation PF_2, to prefetch (i.e., pre-read) the second data D_i required by the subsequent data access code segment C3_1', wherein execution time of the data prefetch operation PF_1 overlaps execution time of the data prefetch operation PF_2. In step S406, the processor 302 executes the subsequent_code segment C2_1 following the data prefetch code segments C1_1 and C1_2 to perform other processing. In step S408, the processor 302 executes the data access code segment C3_1' to check whether the required data D_1 and D_i are already available in the memory 106 through data prefetch. When the required data D_1 and D_i are already available in the memory 106 through data prefetch, the processor 302 executes the data access code segment C3_1' to quickly access the required data D_1 and D_i through the memory 106, without having to slowly access the required data through the memory 104 (step S410).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An embedded gateway system comprising:

a processor, arranged to execute a first program;

a first memory, arranged to store a first data;

a second memory, wherein the first memory and the second memory are external memories of the processor, and access latency of the second memory is lower than access latency of the first memory; and a data prefetch circuit, arranged to perform a first data prefetch operation upon the first memory for reading a first prefetched data from the first memory and writing the first prefetched data into the second memory, wherein before a time point at which the processor executes a data access code segment of the first program to access the first data, the first data prefetch operation reads the first data from the first memory as the first prefetched data.

2. The embedded gateway system of claim 1, wherein the first data prefetch operation completes writing the first data into the second memory at the time point or before the time point.

3. The embedded gateway system of claim 1, wherein the first memory is a dynamic random access memory (DRAM), and the second memory is a static random access memory (SRAM).

4. The embedded gateway system of claim 1, wherein the processor acts as a network processing unit (NPU).

5. The embedded gateway system of claim 1, wherein the processor is a RISC-V processor.

6. The embedded gateway system of claim 1, wherein the processor is further arranged to execute a second program for inserting a data prefetch code segment into the first program; and the processor executes the data prefetch code segment before the data access code segment, to instruct the data prefetch circuit to initiate the first data prefetch operation.

7. The embedded gateway system of claim 6, wherein the processor is further arranged to execute the second program to measure execution time required by the first data prefetch operation to obtain a first time delay parameter, and refer to at least the first time delay parameter to determine an insertion point where the data prefetch code segment is inserted into the first program.

8. The embedded gateway system of claim 7, wherein the processor is further arranged to execute the second program to measure execution time required by different numbers of program code lines in the first program executed by the processor, to obtain a plurality of second time delay parameters, respectively, and refer to at least one second time delay parameter that is among the plurality of second time delay parameters and larger than the first time delay parameter, to determine the insertion point where the data prefetch code segment is inserted into the first program.

9. The embedded gateway system of claim 6, wherein the processor is further arranged to execute the second program to measure execution time required by different numbers of program code lines in the first program executed by the processor, to obtain a plurality of time delay parameters, respectively, and refer to at least the plurality of time delay parameters to determine an insertion point where the data prefetch code segment is inserted into the first program.

10. The embedded gateway system of claim 1, wherein the first memory is further arranged to store a second data; the data prefetch circuit is further arranged to perform a second data prefetch operation upon the first memory for reading a second prefetched data from the first memory and writing the second prefetched data into the second memory; before a time point at which the processor executes the data access code segment to further access the second data, the second data prefetch operation reads the second data from the first memory as the second prefetched data; and execution time of the first data prefetch operation overlaps execution time of the second data prefetch operation.

11. An embedded gateway system comprising:

a RISC-V processor, arranged to execute a first program;

a first memory, arranged to store a first data;

a second memory, wherein access latency of the second memory is lower than access latency of the first memory; and a data prefetch circuit, arranged to perform a first data prefetch operation upon the first memory for reading a first prefetched data from the first memory and writing the first prefetched data into the second memory, wherein before a time point at which the RISC-V processor executes a data access code segment of the first program to access the first data, the first data prefetch operation reads the first data from the first memory as the first prefetched data.

12. The embedded gateway system of claim 11, wherein the first data prefetch operation completes writing the first data into the second memory at the time point or before the time point.

13. The embedded gateway system of claim 11, wherein the first memory is a dynamic random access memory (DRAM), and the second memory is a static random access memory (SRAM).

14. The embedded gateway system of claim 11, wherein the RISC-V processor acts as a network processing unit (NPU).

15. The embedded gateway system of claim 11, wherein the RISC-V processor is further arranged to execute a second program for inserting a data prefetch code segment into the first program; and the RISC-V processor executes the data prefetch code segment before the data access code segment, to instruct the data prefetch circuit to initiate the first data prefetch operation.

16. The embedded gateway system of claim 15, wherein the RISC-V processor is further arranged to execute the second program to measure execution time required by the first data prefetch operation to obtain a first time delay parameter, and refer to at least the first time delay parameter to determine an insertion point where the data prefetch code segment is inserted into the first program.

17. The embedded gateway system of claim 16, wherein the RISC-V processor is further arranged to execute the second program to measure execution time required by different numbers of program code lines in the first program executed by the RISC-V processor, to obtain a plurality of second time delay parameters, respectively, and refer to at least one second time delay parameter that is among the plurality of second time delay parameters and larger than the first time delay parameter, to determine the insertion point where the data prefetch code segment is inserted into the first program.

18. The embedded gateway system of claim 15, wherein the RISC-V processor is further arranged to execute the second program to measure execution time required by different numbers of program code lines in the first program executed by the RISC-V processor, to obtain a plurality of time delay parameters, respectively, and refer to at least the plurality of time delay parameters to determine an insertion point where the data prefetch code segment is inserted into the first program.

19. The embedded gateway system of claim 11, wherein the first memory is further arranged to store a second data; the data prefetch circuit is further arranged to perform a second data prefetch operation upon the first memory for reading a second prefetched data from the first memory and writing the second prefetched data into the second memory; before a time point at which the RISC-V processor executes the data access code segment to further access the second data, the second data prefetch operation reads the second data from the first memory as the second prefetched data; and execution time of the first data prefetch operation overlaps execution time of the second data prefetch operation.

* * * * *